United States Patent Office 3,063,923
Patented Nov. 13, 1962

3,063,923
FUSED REACTOR FUELS
Stanley W. Mayer, Canoga Park, Calif., assignor, by mesne assignments, to the United States of America as represented by the United States Atomic Energy Commission
No Drawing. Filed June 1, 1959, Ser. No. 817,087
13 Claims. (Cl. 204—154.2)

This invention relates to novel reactor fuel compositions. More particularly, this invention relates to novel fused reactor fuel composition.

Nuclear reactor fuels are compositions containing one or more of the fissionable elements uranium, thorium and plutonium. Various compositions useful as reactor fuels have been suggested and tried. Fused salt fuels such as the NaF-UF$_4$ system have been used in the Aircraft Reactor Experiment. The LMFR reactor at the Brookhaven National Laboratory employed a Bi-U$^{233}$ fuel with a Th$_3$Bi$_5$-Bi blanket. Still another type is the aqueous homogeneous reactor which employs such fuels as an aqueous uranyl sulfate solution. Each of these types of reactors, of course, has a number of disadvantages. The LMFR has a low solubility of fissionable uranium in bismuth, thus requiring an exceptionally large core volume to reach criticality. Another disadvantage of the LMFR is that molten bismuth is readily attacked by oxygen upon exposure to air. The fluoride salts in the fused salts reactor are found to be very corrosive which puts limitation on the type of material that can be used to contain the core solution. The aqueous homogeneous fuel reactors are handicapped by a low operating temperature. To attain greater power output, the aqueous homogeneous reactors are operated at high pressure. This places a restriction on the type of material that can be used in the fabrication of the core which, in effect, must be a high pressure vessel. A need exists, therefore, for a reactor fuel which has a low vapor pressure at high temperatures, has a low solidification temperature and has relatively low susceptibility to radiation damage.

It is, therefore, an object of this invention to provide a composition suitable for use as a reactor fuel which has a low vapor pressure in the molten state. Another object of this invention is to provide a fused reactor fuel which has a low solidification temperature. Another object is to provide a nuclear reactor fuel which has a relatively low susceptibility to radiation damage. Still another object of this invention is a nuclear reactor fuel composition which is stable in the presence of air. Other objects of this invention will become more apparent from the discussion which follows.

The above and other objects of this invention are accomplished by providing fissionable material in the form of fused salt compositions wherein the compositions contain sulfur and/or halogen in the form, for example, of metal sulfates, metal halides, and/or metal halosulfonates. The presence of such sulfur and/or halogen compounds improves the solubility of the fissionable metal salts. Hence, an embodiment of this invention is a composition of matter useful as a nuclear reactor fuel comprising (1) from about 0.01 to about 50 weight percent based on the total weight of said composition of at least one element selected from the class consisting of uranium, thorium and plutonium, wherein said element is present in the form of at least one component selected from the class consisting of oxides, halides and oxyacid salts, with (2) at least one member selected from the class consisting of (a) sulfur, wherein said sulfur is in the form of at least one entity selected from the class consisting of oxides of sulfur, metal sulfates, metal sulfites, acids of sulfur and metal halosulfonates, (b) halogen, wherein said halogen is in the form of at least one member selected from the class consisting of metal halides, metal halosulfonates and metal halophosphates, (c) phosphorus, wherein said phosphorus is in the form of at least one constituent selected from the class consisting of oxides of phosphorus, metal phosphates, metal phosphites and metal halophosphates, and (d) metal oxides, wherein the amount of at least one member selected from the class consisting of halogen and sulfur is at least about one atom percent based on the amount of the sum of said sulfur, halogen and phosphorus atoms in said composition; and wherein the sum of said sulfur entities, said phosphorus constituents and said halogen compounds in said composition which do not contain uranium, thorium or plutonium atoms, is at least about 60 weight percent based on the combined weight of the components of the composition which are free of the uranium, thorium and plutonium elements. An example of such a fuel is a composition containing sodium metaphosphate and uranyl sulfate in proportions such as to provide 35.4 weight percent uranium. This solution has a solidification temperature of 352° C. It serves well as a nuclear reactor fuel composition. Another fuel composition is one which, in addition to the sodium metaphosphate-uranyl sulfate solution mentioned above, contains up to about 40 weight percent of a metal oxide such as sodium oxide.

When the fissionable fuel employed in the composition contains uranium, the uranium can be in the form of oxides, halides or oxyacid salts, or mixtures of two or more of these forms. When the uranium is in the form of the oxide, the latter can be any of the well known oxides of uranium as, for example, UO$_2$, U$_3$O$_8$ and UO$_3$. When the uranium is employed in the form of the halides, it can be in the form of any of the halides as, for example, UCl$_4$, UF$_4$, etc. UF$_4$, however, is the one preferred when the halide of uranium is employed because fluorine has a lower neutron capture cross section than do the other halogens. When the uranium is employed in the form of an oxyacid salt, it can be used in the form of one or more of salts such as uranyl sulfate, UO$_2$SO$_4$, uranyl nitrate, UO$_2$(NO$_3$)$_2$, uranyl pyrosulfate, UO$_2$S$_2$O$_7$, uranyl sulfite, UO$_2$SO$_3$, uranyl chromate, UO$_2$CrO$_4$, uranyl phosphates, UO$_2$(PO$_3$)$_2$, (UO$_2$)$_2$P$_2$O$_7$, uranyl fluorophosphate, (UO$_2$)$_3$(FPO$_3$)$_2$, uranyl carbonates, UO$_2$CO$_3$, Na$_2$UO$_2$(CO$_3$)$_2$, uranyl molybdate, UO$_2$MoO$_4$, uranyl silicate, UO$_2$SiO$_3$, U(SO$_4$)$_2$, UP$_2$O$_7$, U(PO$_3$)$_4$, U(PO$_3$)$_3$, etc.

When one of the fuels employed is thorium, it can be in the form of an oxide, a halide or an oxyacid salt or a mixture of two or more different forms as in the case of uranium. For example, the thorium can be in the form of thorium dioxide, ThO$_2$. The fuel can also be in the form of one or more halides such as, for example, thorium fluoride, ThF$_4$, thorium chloride, ThCl$_4$, ThBr$_4$, etc. When oxyacid salts of thorium are employed, they can be any of one or more oxyacid salts, as, for example, Th(SO$_4$)$_2$, ThO(SO$_4$), Th(S$_2$O$_7$)$_2$, Th(NO$_3$)$_4$, ThO(NO$_3$)$_2$, thorium carbonate, thorium chromate, thorium molybdate, thorium fluosulfonate, etc.

When plutonium is employed as a fuel, it too can be in at least one form such as oxides of plutonium, halides of plutonium, and oxyacid salts of plutonium. For example, the plutonium can be present in the form of one or more oxides such as PuO$_2$, PuO$_3$, Pu$_2$O$_3$, and Pu$_3$O$_8$. As a halide, the plutonium can be present in the form of PuF$_3$, PuF$_4$, PuBr$_4$, PuCl$_3$, PuCl$_4$, PuClF$_3$, etc., or a mixture of two or more of these. When the halides of the fissionable materials are included in the reactor fuel compositions, it is preferred to use the fluorides of the elements since these are more stable than the other halogen derivatives and have lower neutron capture cross sections. When the oxyacid salts of plutonium are used, they can be one or more of the following: $PuO_2SO_4$, $PuO_2S_2O_7$, plutonium phosphates such as $PuP_2O_7$, plutonium metaphosphates such as $PuO_2(PO_3)_2$, $Pu(PO_3)_4$, plutonium nitrates such as $PuO_2(NO_3)_2$, plutonium carbonates such as $PuO_2CO_3$, plutonium chromate, $Pu(CrO_4)_2$, plutonium molybdate, $PuO_2MoO_4$, etc.

The sulfur can be present in the composition in the form of oxides of sulfur and metal sulfur compounds such as metal sulfates, metal sulfites, metal halosulfonates and acids of sulfur. Examples of oxides of sulfur are sulfur trioxide, $SO_3$, and $S_2O_7$. When present in the form of metal sulfur compounds, the sulfur can be present as the sulfate, sulfite or halosulfonate of any metal. By sulfates is included all the various sulfates as, for example, orthosulfates, pyrosulfates, hydrogensulfates, peroxisulfates, etc. For example, the sulfates can be the alkali metal sulfates of group IA of the periodic table of the elements. The periodic table referred to in this writing is that found in the "Handbook of Chemistry and Physics," pages 392, 393 (1955–1956), 37th edition, published by the Chemical Rubber Publishing Company, Cleveland, Ohio. Non-limiting examples of group IA alkali metal sulfur-containing compounds are lithium sulfate, lithium hydrogen sulfate, lithium pyrosulfate, lithium fluosulfonate, sodium sulfate, sodium hydrogen sulfate, sodium pyrosulfate, sodium peroxidisulfate, sodium sulfite, sodium fluosulfonate, potassium sulfate, potassium acid sulfate, potassium pyrosulfate, potassium peroxidisulfate, rubidium sulfate, potassium fluosulfonate, rubidium hydrogen sulfate, rubidium pyrosulfate, rubidium fluosulfonate, cesium sulfate, cesium hydrogen sulfate, cesium pyrosulfate, etc. Non-limiting examples of group IIA sulfur-containing compounds are magnesium sulfate, calcium sulfate, strontium sulfate, strontium hydrogen sulfate, barium sulfate, barium peroxidisulfate, etc. Non-limiting examples of group IIIB sulfur-containing compounds are lanthanum sulfate, ceric sulfate, cerous sulfate, samarium sulfate, gadolinium sulfate, yttrium sulfate, etc. Non-limiting examples of group IVB metal sulfur-containing compounds include titanium sulfate and zirconium sulfate. Non-limiting examples of group VB sulfur-containing compounds are tantalum sulfate and niobium sulfate. Non-limiting examples of group VIB sulfates include chromium sulfates, $CrSO_4$, and

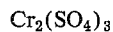

$Cr_2(SO_4)_3$ chromium sulfite, $Cr_2(SO)_3$. Non-limiting examples of group VIIB sulfur-containing compounds include manganese sulfate. Non-limiting examples of group VIII metal sulfur-containing compounds include ferric sulfate, ferrous sulfate, cobaltic sulfate, cobaltous sulfate, rhodium sulfate, nickel sulfate, etc. Non-limiting examples of group IB sulfur-containing compounds are cupric sulfate, cuprous sulfate and silver sulfate. Non-limiting examples of group IIB sufur-containing compounds include zinc sulfate and cadmium sulfate. Non-limiting examples of group IIIA sulfur-containing compounds include aluminum sulfate, gallium sulfate, indium sulfate, thallic sulfate and thallous sulfate. Non-limiting examples of group IVA sulfur-containing compounds include stannic sulfate, stannous sulfate, lead sulfate and basic lead sulfate.

The acids of sulfur include sulfuric acid, $H_2SO_4$ and pyrosulfuric acid, $H_2S_2O_7$. Sulfur can also be present in the form of the sulfates of the fissionable material such as uranyl sulfate, uranyl pyrosulfate, thorium sulfate and plutonium sulfate, etc.

When the reactor fuel composition of this invention is composed of fissionable material together with the sulfate, its composition comprises (1) from about 0.01 to about 50 weight percent based on the total weight of said composition of at least one element selected from the class consisting of uranium, thorium and plutonium, wherein said element is present in the form of at least one component selected from the class consisting of oxides, halides and oxyacid salts with (2) at least one member selected from the class consisting of (a) sulfur, wherein said sulfur is in the form of at least one entity selected from the class consisting of oxides of sulfur, metal sulfates and acids of sulfur and (b) halogen, wherein said halogen is in the form of at least one member selected from the class consisting of metal halides, metal halosulfonates and metal halophosphates.

One of the advantages of the compositions of this invention is that a considerable amount of nuclear fissionable material is brought into solution at relatively low temperatures. Also, the viscosity of the melt is considerably reduced facilitating transfer of the composition through heat exchangers, and fission product removal. To insure a molten state at lower temperatures when sulfur-containing compounds other than compounds of the fissionable material are employed, it is preferable that the amount of sulfur which is present in the form of alkali metal sulfur-containing compounds is at least about 10 atom percent. Sulfur in the form of alkali metal sulfur-containing compounds within the range of from about 10 to about 90 atom percent sulfur are found to provide good fuel compositions. It is also found that the solubility of the thorium, uranium and plutonium fissionable material is enhanced in the case where metal sulfur-containing compounds other than those of the fissionable material are employed, when the amount of sulfur in the composition is at least about 25 atom percent. Sulfur components in the composition, wherein the atom percent sulfur in the form of alkali metal sulfur-containing compounds is from about 25 to about 75 atom percent, are found to be advantageous in this respect and, therefore, represent an especially preferred composition with respect to the type of metal sulfur-containing compounds present.

As stated hereinabove the amount of uranium, thorium and/or plutonium in the composition can vary from about 0.01 weight percent to about 50 weight percent based on the total weight of the composition. Natural uranium containing about 0.71 weight percent U–235 is used as well as uranium that is enriched in the U–235 isotope. The U–235 isotope is also used by itself as is the U–233 isotope. Uranium containing less than 0.71 weight percent U–235 is also used as well as combinations of various uranium isotopes. Since it is preferable to have as high a concentration as possible of the fissionable material, namely, the uranium, thorium and/or plutonium, it is preferred that the composition contain from about 0.1 to about 50 weight percent of the elements based on the total weight of the composition. Another preferred embodiment of this invention are compositions containing from about 1 to about 50 weight percent of the thorium, uranium and/or plutonium elements since the more concentrated the latter three elements are in the composition the more economical is the fuel for use in a nuclear reactor. Especially preferred are compositions containing from about 10 to about 36 weight percent of one or more of the thorium, uranium and plutonium elements since this range of concentrations of these elements provides the most readily preparable compositions for use in homogeneous fused liquid fuel reactors operating at comparatively low temperatures with highest efficiency. For example, one of the preferred compositions is a uranium-containing solution wherein the uranium is present in about 10 weight percent in the form of uranyl sulfate in a solution of sodium sulfate and zinc sulfate wherein about 25 atom percent of the sulfur is present in the form of sodium sulfate.

In addition, the compositions can contain up to about 40 weight percent of the total weight of the components other than the uranium, thorium and/or plutonium compounds, of any metal oxide or mixture of metal oxides. Non-limiting examples of metal oxides that may be present are lithium oxide in the amount of one weight percent or gadolinium oxide in the amount of 40 weight percent. Non-limiting examples of other oxides are sodium oxide, potassium oxide, cesium oxide, barium oxide, zirconium oxide, vanadium oxide, tungsten oxide, manganese oxide, ferric oxide, rhodium oxide, platinum oxide, silver oxide, zinc oxide, thallium oxide, lead oxide, antimony oxide, selenium oxide, bismuth oxide, etc. Thus the oxide is an oxide of a metal having an atomic number of from 3 to about 83.

When halogen is present in the composition, it is in the form of at least one member selected from the class consisting of metal halides, metal halosulfonates and metal halophosphonates, wherein the metal has an atomic number of from 3 to 93. Non-limiting examples of such halogen-containing compounds include metal halides such as lithium fluoride, sodium fluoride, potassium fluoride, rubidium fluoride, cesium fluoride, calcium fluoride, lanthanum fluoride, titanium fluoride, vanadium fluoride, chromium fluoride, manganese fluoride, ferric fluoride, thorium fluoride, uranium fluoride, plutonium fluoride, etc.; metal halosulfonates such as lithium fluosulfonate, sodium fluosulfonate, potassium fluosulfonate, rubidium fluosulfonate, cesium fluosultonate, calcium fluosultonate, uranyl fluosulfonate, thorium fluosulfonate, the fluosulfonates of plutonium, etc.; metal halophosphates such as lithium fluorophosphate, sodium monofluorophosphate, sodium hexafluorophosphate, potassium fluorophosphate, rubidium fluorophosphate, cesium fluorophosphate, strontium fluorophosphate, ferric fluorophosphate, thorium fluorophosphate, uranium fluorophosphate, uranyl fluorophosphate, plutonium fluorophosphate, etc.

The fuel compositions of this invention are prepared by heating the components in a container made of a suitable material such as, for example, Inconel, stainless steel, borosilicate glass, quartz, etc. The obtaining of a substantially homogeneous solution is aided by stirring or otherwise agitating the composition during and after melting. The components may be added to the container in which they are melted in any order. For example, all the components may be added to the container before the heating is commenced. Alternatively, the components may be mixed in the powdered state before placing in the container for heating purposes. In another variation of preparing the molten solution, the component having the lowest melting point is added first. Heat is then applied to melt the component as say, for example, the application of heat to sodium metaphosphate. The other components such as sodium sulfate and uranyl sulfate are added to the molten sodium metaphosphate while continuing to heat the container until the entire composition is molten.

Non-limiting examples of specific compositions of this invention containing a fissionable material and various sulfur and halogen components as well as oxides are given in the following table.

TABLE I

| No. | Component | Parts by weight | Weight percent U, Th or Pu | Remarks |
|---|---|---|---|---|
| 1 | $UO_2SO_4$ | 0.3 | 0.01 (U-235) | |
|   | $Na_2SO_4$ | 1,410 | | |
|   | $ZnSO_4$ | 940 | | |
| 2 | $UO_2S_2O_7$ | 4.4 | 0.1 (U-235) | |
|   | $K_2S_2O_4$ | 782 | | |
|   | $CuSO_4$ | 1,564 | | |
| 3 | $U_3O_8$ | 2.8 | 1 (20% U-235) | 40 weight percent oxides of metals other than oxides of fissionable material based on weight of components other than $U_3O_8$. |
|   | $LiHSO_4$ | 138 | | |
|   | $Na_2O$ | 60 | | |
|   | $MoO$ | 26 | | |
|   | $Fe_2O_3$ | 7 | | |
| 4 | $UO_2SO_4$ | 36 | 10 (10% U-235) | 1 weight percent $CuO$ based on components other than $UO_2SO_4$. |
|   | $H_2SO_4$ | 4 | | |
|   | $SO_3$ | 2 | | |
|   | $Rb_2SO_4$ | 78 | | |
|   | $ZrSO_4$ | 116 | | |
|   | $CuO$ | 2 | | |
| 5 | $UO_3$ | 72 | 25 (natural U) | 10 atom percent of the S present is in the form of alkali metal sulfates. |
|   | $SO_3$ | 20 | | |
|   | $NaSO_3F$ | 3 | | |
|   | $Na_2SO_4$ | 15 | | |
|   | $MgSO_4$ | 96 | | |
|   | $SrSO_4$ | 20 | | |
|   | $Sm_2(SO_4)_3$ | 11 | | |
| 6 | $UF_4$ | 32.3 | 25 | 90 atom percent of the S present is in the form of alkali metal sulfates. |
|   | $ThCl_4$ | 13 | 8 | |
|   | $Pu(NO_3)_3$ | 3.6 | 2 | |
|   | $Li_2SO_4$ | 42 | | |
|   | $CaSO_4$ | 3 | | |
|   | $PbSO_4$ | 2 | | |
|   | $ZnSO_4$ | 3 | | |
| 7 | $UO_3$ | 60 | 50 | 75 atom percent of the S is present in the form of an alkali metal sulfate. |
|   | $Li_2SO_4$ | 27 | | |
|   | $Zn(SO_4)$ | 13 | | |
| 8 | $UO_3$ | 60 | 50 | 25 atom percent of the S is present in the form of an alkali metal sulfate. |
|   | $LiSO_4$ | 8 | | |
|   | $ZnSO_4$ | 32 | | |
| 9 | $Th(SO_4)_2$ | .4 | 0.01 | |
|   | $Na_2SO_4$ | 1,400 | | |
|   | $ZnSO_4$ | 930 | | |
| 10 | $ThSiO_4$ | 3.2 | 0.1 | |
|   | $K_2S_2O_4$ | 773 | | |
|   | $Ag_2SO_4$ | 1,544 | | |
| 11 | $Th(SO_4)_2$ | 4.2 | 1 | 40 weight oxides of metals other than oxides of fissionable material based on weight of components other than $Th(SO_4)_2$. |
|   | $NaHSO_4$ | 137 | | |
|   | $SiO_2$ | 60 | | |
|   | $WO_3$ | 25 | | |
|   | $Ni_2O_3$ | 6 | | |
| 12 | $Th(SO_4)_2$ | 42 | 10 | 1 weight percent metal oxide present based on weight of components other than $Th(SO_4)_2$. |
|   | $H_2SO_4$ | 4 | | |
|   | $SO_3$ | 2 | | |
|   | $CsSO_3F$ | 73 | | |
|   | $MnSO_4$ | 109 | | |
|   | $B_2O_3$ | 2 | | |
| 13 | $ThO_2$ | 66 | 25 | 10 atom percent of the sulfur is in the form of alkali metal sulfates. |
|   | $SO_3$ | 40 | | |
|   | $K_2S_2O_7$ | 12 | | |
|   | $MgSO_4$ | 50 | | |
|   | $PbSO_4$ | 50 | | |
|   | $CaSO_4$ | 14 | | |
| 14 | $ThF_4$ | 20 | 15 | 90 atom percent of the sulfur is in the form of alkali metal sulfates. |
|   | $UO_2(NO_3)_2$ | 35 | 21 | |
|   | $RbHSO_4$ | 40 | | |
|   | $CdSO_4$ | 2 | | |
|   | $MnSO_4$ | 2 | | |
|   | $CrSO_4$ | 1 | | |
| 15 | $ThO_2$ | 57 | 50 | 25 atom percent of the sulfur is in the form of an alkali metal sulfate. |
|   | $Na_2SO_4$ | 10 | | |
|   | $ZnSO_4$ | 30 | | |
|   | $H_2S_2O_7$ | 3 | | |
| 16 | $PuO_2SO_4$ | 0.3 | 0.01 | |
|   | $Na_2SO_4$ | 1,460 | | |
|   | $ZnSO_4$ | 970 | | |
| 17 | $PuO_2S_2O_7$ | 4.4 | 0.1 | |
|   | $K_2S_2O_4$ | 782 | | |
|   | $CuSO_4$ | 1,564 | | |
| 18 | $Pu_2O_3$ | 2.6 | 1 | 40 weight percent oxides of metals other than oxides of fissionable material based on components other than $Pu_2O_3$. |
|   | $K_2SO_4$ | 142 | | |
|   | $CaO$ | 40 | | |
|   | $As_2O_5$ | 40 | | |
|   | $NaF$ | 14 | | |
| 19 | $PuO_3$ | 29 | 10 | 1 weight percent oxides of metal other than oxides of fissionable material based on weight of components other than $PuO_3$. |
|   | $H_2SO_4$ | 5 | | |
|   | $SO_3$ | 3 | | |
|   | $LiS_2O_4$ | 80 | | |
|   | $ZnSO_4$ | 120 | | |
|   | $Al_2O_3$ | 2.4 | | |
| 20 | $PuO_2SO_4$ | 92 | 25 | 10 atom percent sulfur in form of alkali metal sulfur compounds. |
|   | $K_2SO$ | 15 | | |
|   | $Tl_2SO_4$ | 50 | | |
|   | $CeSO_4$ | 33 | | |
|   | $BaSO_4$ | 50 | | |
| 21 | $PuO_2$ | 135 | 50 | 75 atom percent sulfur in form of alkali metal sulfates. |
|   | $K_2SO_4$ | 75 | | |
|   | $ZnSO_4$ | 25 | | |
|   | $H_2SO_4$ | 4 | | |
| 22 | $Th(CO_3)_2$ | 20 | | |
|   | $U(CrO_4)_2$ | 25 | | |
|   | $Pu(SiO_4)_2$ | 10 | | |
|   | $RbHS_2O_7$ | 45 | | |
|   | $CdSO_4$ | 2 | | |
|   | $MnSO_4$ | 2 | | |
|   | $CrSO_4$ | 1 | | |

Another form of the compositions of this invention is one in which the uranium, thorium and/or plutonium fissionable material together with sulfur compounds contains, in addition, phosphorus compounds wherein the phosphorus is in the form of oxides of phosphorus, metal phosphites, metal phosphates and metal halophosphates, and wherein the amount of sulfur is at least about one atom percent based on the amount of the sum of the sulfur and phosphorus atoms in the composition. Thus, an embodiment of this invention is a nuclear reactor fuel composition comprising (1) from about 0.01 to about 50 weight percent based on the total weight of said composition of at least one element selected from the class consisting of uranium, thorium and plutonium wherein said element is present in the form of at least one component selected from the class consisting of oxides, halides and oxyacid salts with (2) at least one member selected from the class consisting of (a) sulfur, wherein said sulfur is in the form of at least one entity selected from the class consisting of oxides of sulfur, metal sulfates, metal sulfites, acids of sulphur and metal halosulfonates, (b) halogen, wherein said halogen is in the form of at least one member selected from the class consisting of metal halides, metal halosulfonates and metal halophosphates, (c) phosphorus, wherein said phosphorus is in the form of at least one constituent selected from the class consisting of oxides of phosphorus, metal phosphates, metal phosphites and metal halophosphates, wherein the amount of at least one member selected from the class consisting of halogen and sulfur is at least about one atom percent based on the amount of the sum of said sulfur, halogen and phosphorus atoms in said composition. Hence, the amount of sulfur and/or halogen in the composition based on the total atom percent of sulfur, halogen and phosphorus can vary from about one atom percent to 100 atom percent. At least about one atom percent of sulfur or halogen is required in the composition in order to lower the viscosity of the solution and thus provide a molten fuel composition which can be employed both as a fuel in the critical region of the reactor core and as a coolant by circulating the solution through an external heat exchanger.

Another embodiment of this invention is a fuel composition in which the amount of sulfur based on the total amount of sulfur and phosphorus is from about one atom percent to about 99 atom percent. This provides a fuel composition having a suitable viscosity for molten fuel reactors. Another embodiment of this invention is a composition in which at least about 10 atom percent of the sulfur present is in the form of alkali metal sulfur-containing compounds since then, not only is a suitably low viscosity obtained but a lower melting point solution is provided which further enhances the attractiveness of the solution as a nuclear reactor fuel composition. While it is preferable to have at least about 10 atom percent of the sulfur present in the form of alkali metal sulfates, it is especially preferred that the sulfur present in the form of alkali metal sulfates or alkali metal pyrosulfates range from about 25 to about 75 atom percent of the sulfur in the composition since then a higher degree of fissionable fuel material solubility is obtained at lower temperatures and at lower viscosities of the melt.

As stated hereinabove the amount of fissionable material in the fuel can vary from about 0.01 to about 50 weight percent based on the total weight of the composition. Compositions containing from about 0.1 to about 50 weight percent, however, are preferred in order to more easily obtain the critical mass in the reactor core. For still better performance, fuel compositions containing from about 1 to about 50 weight percent are preferred. However, since it is desirable to have as high a concentration of fissionable material as possible in the reactor fuel in order to obtain high fuel burn-up and greater economy in the production of power, it is found that concentrations of the fissionable material of from about 10 to about 36 percent are exceptionally good. Therefore, compositions containing the latter range of concentrations of uranium, thorium and/or plutonium constitute a preferred embodiment of this invention.

The phosphorus employed in the compositions of this invention is present in the form of at least one constituent selected from the class consisting of oxides of phosphorus and metal phosphates. A non-limiting example of oxides of phosphorus is $P_2O_5$. Non-limiting examples of the metal phosphates include the phosphates of the group IA metals such as lithium orthophosphate, lithium dihydrogen phosphate, sodium dihydrogen hypophosphate, sodium orthophosphate, sodium monohydrogen phosphate, sodium dihydrogenphosphate, sodium pyrophosphate, sodium metaphosphate, sodium tripolyphosphate, $Na_5P_3O_{10}$, sodium monofluorophosphate, sodium hexafluorophosphate, potassium orthophosphate, potassium monohydrogen phosphate, potassium dihydrogen phosphate, potassium metaphosphate, potassium hexafluorophosphate, rubidium metaphosphate, cesium metaphosphate; the phosphates of the group IIA elements such as beryllium phosphate, magnesium phosphate, magnesium hydrogen phosphate, magnesium metaphosphate, calcium phosphate, calcium monohydrogen phosphate, calcium dihydrogen phosphate, calcium metaphosphate, strontium phosphate, strontium acid phosphate, barium phosphate, barium monohydrogen phosphate; the group IIIB phosphates such as lanthanum phosphate; the group IVB phosphates such as zirconium phosphate; the group VB phosphates such as vanadium phosphate; the group VIB phosphates such as chromium phosphate, molybdenum metaphosphate; the group VIIB phosphates such as manganese orthophosphate, manganese monohydrogen orthophosphate, manganese dihydrogen orthophosphate, manganic orthophosphate, manganese pyrophosphate, manganic metaphosphate; the group VIII metal phosphates such as ferric orthophosphate, ferric pyrophosphate, cobalt orthophosphate, nickel orthophosphate, nickel pyrophosphate, platinum pyrophosphate; the group IB phosphates such as cupric orthophosphate, silver orthophosphate, silver monohydrogen orthophosphate, silver metaphosphate; the group IIB phosphates such as zinc orthophosphate, zinc dihydrogen orthophosphate, zinc pyrophosphate, cadmium orthophosphate, cadmium dihydrogen phosphate, mercuric orthophosphate; the group IIIA phosphates such as aluminum orthophosphate, thallium orthophosphate, thallium dihydrogen orthophosphate; the group IVA phosphates such as stannous orthophosphate, stannous monohydrogen orthophosphate, stannous dihydrogen orthophosphate, stannous pyrophosphate, stannous metaphosphate, lead orthophosphate, lead diorthophosphate, lead mono orthophosphate, lead metaphosphate; the group VA phosphates such as bismuth orthophosphates; the rare earth phosphates such as cerous orthophosphate, cerous metaphosphate, samarium phosphate, gadolinium phosphate, etc.

In order to ensure as low a viscosity for the molten fuel composition as possible, it is preferable that at least about 60 atom percent of the phosphorus, other than the phosphorus present in the compounds containing fissionable material, be present in the form of alkali metal phosphorus-containing compounds or oxides of phosphorus such as $P_2O_5$. This then constitutes a preferred embodiment of this invention. It is especially preferred that at least 60 atom percent of the phosphorus, other than the phosphorus present in the compounds containing fissionable material, be in the form of alkali metal metaphosphate or $P_2O_5$ since then a greater reduction in the viscosity of the molten composition is obtained.

Non-limiting examples of various fuel compositions containing both phosphorus and sulfur and/or halogen atoms therein are given in the following Table II.

TABLE II

| No. | Components | Parts by weight | Weight Percent U, Th or Pu | Atom Percent S based on S and P | Atom Percent P based on S and P | Remarks |
|---|---|---|---|---|---|---|
| 1 | $UO_3$ | 0.03 | 0.01 | | | 60 atom percent of the phosphorous is present in the form of alkali metal meta phosphate. |
| | $NaPO_3$ | 140 | | | 99 | |
| | $Ca(PO_3)_2$ | 92 | | | | |
| | $Na_2SO_4$ | 3 | | 1 | | |
| 2 | $UF_4$ | 0.3 | 0.1 | | | |
| | $NaPO_3$ | 1.7 | | | 1 | |
| | $Na_2SO_4$ | 233 | | 99 | | |
| 3 | $U_3O_8$ | 2.8 | 1 | | | Metal oxides other than oxides of uranium constitute 40 weight percent of composition, excluding the weight of $U_3O_8$. |
| | $KPO_3$ | 119 | | | 95 | |
| | $Cs_2SO_4$ | 20 | | 5 | | |
| | $Na_2O$ | 45 | | | | |
| | $MoO$ | 45 | | | | |
| | $Fe_2O_3$ | 3 | | | | |
| 4 | $UO_2SO_4$ | 36 | 10 | | | 1 weight percent metal oxide based on weight of composition excluding weight of $UO_2SO_4$. |
| | $RbPO_3$ | 188 | | | 85 | |
| | $NaHSO_4$ | 12 | | 15 | | |
| | $ZnO$ | 2 | | | | |
| 5 | $UO_3$ | 72 | 25 | | | 10 atom percent of the S is present in the form of alkali metal sulfates. Of the phosphorus present, 90 atom percent is in the form of alkali metal meta phosphate. |
| | $NaPO_3$ | 112 | | | | |
| | $CrPO_4$ | 18 | | | 90 | |
| | $SO_3$ | 4.4 | | | | |
| | $NaHSO_4$ | .3 | | | | |
| | $Na_2SO_4$ | 3.5 | | | | |
| | $MgSO_4$ | 21.7 | | | | |
| | $SrSO_4$ | 4.4 | | | | |
| | $Sm_2(SO_4)_3$ | 2.5 | | 10 | | |
| 6 | $UF_4$ | 32.3 | 25 | | | 90 atom percent of the sulfur is present as alkali metal sulfate. |
| | $ThCl_4$ | 13 | 8 | | | |
| | $Pu(NO_3)_3$ | 3.6 | 2 | | | |
| | $P_2O_5$ | 19.7 | | | 50 | |
| | $Li_2SO_4$ | 27.3 | | | | |
| | $ZnSO_4$ | 5.1 | | 50 | | |
| 7 | $UO_2$ | 58 | 50 | | | |
| | $P_2O_5$ | 9 | | | | |
| | $K_3PO_4$ | 18 | | | 92 | |
| | $H_2S_2O_7$ | 15 | | 8 | | |
| 8 | $UO_3$ | 41 | 34 | | | |
| | $P_2O_5$ | 13 | | | 74 | |
| | $Na_2S_2O_7$ | 7 | | 26 | | |
| | $Na_2O$ | 13 | | | | |
| 9 | $ThO_2$ | .3 | 0.01 | | | 60 atom percent of the phosphorus is present in the form of oxides of phosphorus. |
| | $P_2O_5$ | 1,192 | | | | |
| | $Ca(PO_3)_2$ | 1,113 | | | 99 | |
| | $ZnSO_4$ | 45 | | 1 | | |
| 10 | $ThF_4$ | 0.3 | 0.1 | | | |
| | $NaPO_3$ | 1.7 | | | 1 | |
| | $Na_2SO_4$ | 233 | | 99 | | |
| 11 | $ThO_2$ | 2.6 | 1 | | | Metal and metalloid oxides other than oxides of thorium constitute 40 weight percent of the composition excluding the weight of $ThO_2$. |
| | $KPO_3$ | 126 | | | 96 | |
| | $Rb_2SO_4$ | 13 | | 4 | | |
| | $SiO_2$ | 45 | | | | |
| | $WO_3$ | 45 | | | | |
| | $Ni_2O_3$ | 6 | | | | |
| 12 | $ThO(SO_4)$ | 36 | 10 | | | 1 weight percent metal chloride based on the weight of the composition excluding $ThO(SO_4)$. |
| | $CsPO_3$ | 188 | | | 97 | |
| | $RbHSO_4$ | 12 | | 3 | | |
| | $FeCl_3$ | 2 | | | | |
| 13 | $ThO_2$ | 66 | 25 | | | 60 atom percent of the alkali metal phosphates are present in the form of alkali metal meta phosphates. |
| | $KPO_3$ | 61 | | | | |
| | $K_3PO_4$ | 67 | | | 73.5 | |
| | $SO_3$ | 5 | | | | |
| | $Na_2SO_4$ | 4 | | | | |
| | $MgSO_4$ | 22 | | | | |
| | $SrSO_4$ | 4 | | | | |
| | $Sm_2(SO_4)_3$ | 3 | | 26.5 | | |
| 14 | $ThF_4$ | 32 | 24 | | | 86 atom percent of the phosphorus is present in the form of $P_2O_5$. Of the sulfur, 93 atom percent is in the form of alkali metal sulfates. |
| | $UO_2(NO_3)_2$ | 14 | 8.5 | | | |
| | $PuBr_3$ | 7 | 3.5 | | | |
| | $P_2O_5$ | 11 | | | | |
| | $AlPO_4$ | 2 | | | | |
| | $Pb(PO_4)_2$ | 1 | | | | |
| | $Cd_3(PO_4)_2$ | 1 | | | 37 | |
| | $LiSO_4$ | 29 | | | | |
| | $CdSO_4$ | 2 | | | | |
| | $MnSO_4$ | 1 | | | | |
| | $CrSO_4$ | 2 | | 63 | | |
| 15 | $ThO_2$ | 57 | 50 | | | |
| | $P_2O_5$ | 30 | | | 75 | |
| | $H_2S_2O_7$ | 13 | | 25 | | |
| 16 | $ThO_2$ | 41 | 36 | | | 40 weight percent of the composition, excluding $ThO_2$, is composed of the metalloid oxide, $SiO_2$. |
| | $P_2O_5$ | 23 | | | 74 | |
| | $Na_2S_2O_7$ | 12.4 | | 26 | | |
| | $SiO_2$ | 23.6 | | | | |
| 17 | $Pu_2O_3$ | 0.3 | 0.01 | | | 60 atom percent of the phosphorus is present in the form of oxides of phosphorus. |
| | $P_2O_5$ | 1,192 | | | | |
| | $Ca(PO_3)_2$ | 1,113 | | | 99 | |
| | $ZnSO_4$ | 45 | | 1 | | |
| 18 | $PuBr_4$ | 0.3 | 0.1 | | | |
| | $NaPO_3$ | 2 | | | 1 | |
| | $Na_2SO_4$ | 237 | | 99 | | |
| 19 | $PuO_2$ | 3 | 1 | | | 40 weight percent of the composition, excluding $PuO_2$, is composed of metal oxides other than $PuO_2$. |
| | $KPO_3$ | 126 | | | 95 | |
| | $Cs_2SO_4$ | 18 | | 5 | | |
| | $CaO$ | 45 | | | | |
| | $Sb_2O_5$ | 45 | | | | |
| | $K_2O$ | 6 | | | | |
| 20 | $PuO_2SO_4$ | 36 | 10 | | | About 1 weight percent metal oxides in composition, based on weight of composition other than $PuO_2SO_4$. |
| | $RbPO_3$ | 188 | | | 88 | |
| | $CsHSO_4$ | 12 | | 12 | | |
| | $CdO$ | 2 | | | | |

TABLE II—Continued

| No. | Components | Parts by weight | Weight Percent U, Th or Pu | Atom Percent S based on S and P | Atom Percent P based on S and P | Remarks |
|---|---|---|---|---|---|---|
| 21 | $Pu_2O_3$ | 70 | 25 | | | 16 atom percent of the sulfur is present in the form of alkali metal sulfur compounds. |
| | $Na_2HPO_4$ | 125 | | | | |
| | $Fe_4(P_2O_7)_3$ | 5 | | | 75 | |
| | $SO_3$ | 5 | | | | |
| | $Na_2SO_4$ | 4 | | | | |
| | $MgSO_4$ | 22 | | | | |
| | $SrSO_4$ | 4 | | | | |
| | $Gd_2(SO_4)_3$ | 3 | | 25 | | |
| 22 | $ThF_4$ | 32 | 24 | | | 60 atom percent of the phosphorus is present as alkali metal meta phosphate. About 90 atom percent of the sulfur is present in the form of an alkali metal sulfur compound. |
| | $Na_2UO_4$ | 14 | 10 | | | |
| | $Na_2Pu_2O_7$ | 3 | 2.3 | | | |
| | $NaPO_3$ | 7.6 | | | | |
| | $Ca(PO_3)_2$ | 3.5 | | | | |
| | $Cu_3(PO_4)_2$ | 3 | | | 28 | |
| | $Li_2SO_4$ | 32 | | | | |
| | $CdSO_4$ | 2 | | | | |
| | $Cr_2(SO_4)_3$ | 3 | | 72 | | |
| 23 | $Pu_2O_3$ | 57 | 52 | | | |
| | $P_2O_5$ | 30 | | | 75 | |
| | $H_2S_2O_7$ | 13 | | 25 | | |
| 24 | $Pu_2(CO_3)_3$ | 40 | 29 | | | 33 weight percent of the composition, excluding $Pu_2(CO_3)_3$, is in the form of the metalloid oxide $SiO_2$. |
| | $P_2O_5$ | 33 | | | 90 | |
| | $K_2S_2O_7$ | 7 | | 10 | | |
| | $SiO_2$ | 20 | | | | |

As noted from the examples given hereinabove the compositions can contain one or more metal or metalloid oxides in an amount equivalent up to about 40 weight percent, based on the weight of the sulfur, the phosphorus and the metal oxide compounds other than the compounds of the uranium, thorium and/or plutonium.

The components employed in the preparation of the fuel compositions in this invention are preferably anhydrous. However, hydrated components may be employed in the preparation of the melts since such components are merely heated to a high enough temperature for a period of time sufficient to drive off the water of hydration, leaving behind the anhydrous counterpart.

Still other non-limiting examples of this invention are illustrated in the following Table III.

TABLE III

| No. | Composition | Solidification temperature, °C. |
|---|---|---|
| | $UO_3$ Compositions | |
| 1 | $UO_3 + 2P_2O_5 + 2H_2S_2O_7$ | 250 |
| 2 | $UO_3 + 2P_2O_5 + 2NaHSO_4$ | 250 |
| 3 | $UO_3 + 3NaPO_3 + 2H_2S_2O_7$ | 200 |
| 4 | $UO_3 + 4NaPO_3 + 2H_2S_2O_7$ | 200 |
| 5 | $UO_3 + 2P_2O_5 + 3NaPO_3 + 2K_2S_2O_7$ | 225 |
| 6 | $UO_3 + P_2O_5 + 3NaPO_3 + 2K_2S_2O_7$ | 200 |
| 7 | $UO_3 + 1.5P_2O_5 + 2NaPO_3 + K_2S_2O_7$ | 275 |
| 8 | $UO_3 + 4P_2O_5 + 6NaPO_3 + 6Na_2SO_4$ | 300 |
| 9 | $UO_3 + 2P_2O_5 + 3NaPO_3 + 2Na_2S_2O_7$ (18 weight percent U) | 225 |
| 10 | $UO_3 + P_2O_5$ | 600 |
| 11 | $UO_3 + 7/6 Na_2SO_4$ | 535 |
| 12 | $UO_3 + P_2O_5 + 3NaPO_3$ | 550 |
| | $UO_2SO_4$ and $UO_2S_2O_7$ Compositions | |
| 13 | $UO_2SO_4 + 3NaPO_3$ (35.4 weight percent U) | 350 |
| 14 | $UO_2SO_4 + H_2SO_4 + 2NaPO_3$ | 350 |
| 15 | $UO_2SO_4 + 7NaHSO_4$ | 310 |
| 16 | $UO_2S_2O_7 + 3.5Na_2SO_4$ | 535 |
| 17 | $UO_2SO_4 + 12NaPO_3 + 4Na_2S_2O_7$ | |
| 18 | $18UO_2SO_4 + 75NaPO_3 + 7Na_2SO_4$ | |
| 19 | $UO_2SO_4 + 3NaPO_3 + Na_2S_2O_7$ | |
| 20 | $27UO_2SO_4 + 73NaPO_3$ | |
| 21 | $UO_2SO_4 + 12NaPO_3 + 4Na_2S_2O_7$ | |
| 22 | $4.16UO_2SO_4 + 12NaPO_3 + 4Na_2S_2O_7$ | |
| 23 | $UO_2SO_4 + 11ZnSO_4 + 9Na_2SO_4$ | |
| 24 | $10UO_2SO_4 + 7NaPO_3 + 3Na_4P_2O_7 + 14Na_2SO_4$ | |
| 25 | $UO_2SO_4 + 3NaPO_3$ | |
| 26 | $9UO_2SO_4 + 91Na_2S_2O_7$ | |
| 27 | $3UO_2SO_4 + 97K_2S_2O_7$ | |
| 28 | $14UO_2SO_4 + 37.5Na_2S_2O_7 + 62.5NaPO_3$ | |
| | $UO_2$ Compositions | |
| 29 | $UO_2 + 2P_2O_5 + 2K_2S_2O_7$ | 350 |
| 30 | $UO_2 + 2P_2O_5 + 3NaPO_3 + 2K_2S_2O_7$ | 350 |
| 31 | $UO_2 + 2P_2O_5 + 4.5NaPO_3$ | 550 |
| 32 | $UO_2 + 2P_2O_5 + 3NaPO_3$ | 550 |
| | $UF_4$ Compositions | |
| 33 | $UF_4 + 2P_2O_5 + 3NaPO_3 + 2K_2S_2O_7$ | 250 |
| 34 | $UF_4 + 3P_2O_5 + 4NaPO_3 + 3K_2S_2O_7$ | 250 |
| | Thorium Compound Compositions | |
| 35 | $Th(NO_3)_4 + 3H_2S_2O_7 + 2Na_2S_2O_7 + 3NaPO_3$ | 300 |
| 36 | $Th(SO_4)_2 + 5Na_2SO_4 + 7.5Na_2S_2O_7$ | 390 |
| 37 | $Th(SO_4)_2 + 3.3Na_2SO_4 + 5Na_2S_2O_7$ | 450 |
| 38 | $Th(SO_4)_2 + 3.5Na_2SO_4$ | 585 |
| 39 | $Th(SO_4)_2 + 11ZnSO_4 + 9Na_2SO_4$ | |
| 40 | $ThO_2 + 3NaPO_3 + 5Na_2S_2O_7$ (14 weight percent Th) | 300 |

The nuclear fuel compositions of this invention are used in reactor cores and reactors heretofore known as molten salt reactors and liquid-metal fuel reactors with no modification except for possible change in core dimensions in order to accommodate the required critical mass. These reactors are described in full in a text entitled "Fluid Fuel Reactors" by Lane, MacPherson and Maslan, Part II and Part III, pages 567 et seq., 1958 edition, published by Addison-Wesley Publishing Company, Inc., Reading Massachusetts, and in the references contained therein. For example, composition No. 4 in Table I is used as a fuel in the Aircraft Reactor Experiment reactor described in full in "Nuclear Science and Engineering," vol. 2, pages 804–853 (1957). When this fuel is used in the ARE reactor, criticality is readily obtained with the excess reactivity controlled by control rods. Good operation is obtained over long periods of time.

The following non-limiting examples illustrate reactor core loadings in which the reactor is of the molten salt type described in detail in the text "Fluid Fuel Reactors," supra, pages 681–696. In general, the reactor operates with the fuel in a fused or molten state within the reactor core, and when circulated there is a rise in temperature of the fused fuel composition within the core of from about 100 to about 600° F., although smaller and greater rises in temperatures are permitted. The uranium used in the following examples is U-233. When other isotopes of uranium are present, the critical mass is given in terms of the U-233 content. The critical masses are as indicated. In the two-region system the core contains a uranium composition around which is contained a two foot blanket of the thorium composition indicated. The core is made of Inconel. Further particulars are contained in the following examples wherein the components of the compositions are given in parts by weight.

*Example I*

A two-region reactor having a core diameter of 3.2 feet is operated on a core composition of 4.2 parts by weight of $UO_2S_2O_7$, 75.5 parts of $RbHSO_4$, 14.4 parts of $CaSO_4$ and 5.9 parts of $Tl_2SO_4$. The amount of uranium in this composition which is in the form of U–233 is 2.2 weight percent. Of the sulfur in the composition, 75 atom percent is present in the form of an alkali metal sulfate, a rubidium acid sulfate in this case. An amount of composition sufficient to provide a critical U–233 mass of 31 kilograms is employed. The two-foot blanket surrounding the core is made up of 11.5 parts of $ThO_2$, 3.5 parts of $SO_3$, 9 parts of $Na_4P_2O_7$, 75.1 parts of $Na_2S_2O_7$ and 0.9 part of $Na_2O$. The amount of material in the blanket is sufficient to provide 1445 kilograms of thorium. The composition contains 10.1 percent of thorium by weight and has 90 atom percent sulfur based on the amount of sulfur and phosphorus present, together with 1 weight percent of the metal oxide, $Na_2O$, based on the weight of components other than the thorium oxide. The reactor is operated satisfactorily at temperatures ranging from that of the molten state at the melting point to about 900° C.

*Example II*

A two-region reactor having a core diameter of 3 feet is operated with a core solution composition described in Example I in an amount sufficient to provide a critical U–233 mass of 25 kilograms. The blanket region surrounding the core is filled with a composition consisting essentially of 54 parts by weight of $ThOSO_4$, 59 parts $KPO_3$, 69 parts $K_3PO_4$, 5 parts $SO_3$, 4 parts $Na_2SO_4$, 16 parts $NaHSO_4$, 4 parts $SrSO_4$ and 3 parts $Sm_2(SO_4)_3$. The amount of the blanket solution is sufficient to provide 2238 kilograms of thorium. The thorium is present in an amount equivalent to 17 weight percent based on the total weight of the composition and the phosphorus-to-sulfur atomic ratio is 2:1, equivalent to 66 atom percent phosphorus based on the phosphorus and sulfur present. Of the sulfur in the composition, 39 atom percent is present in the form of alkali metal sulfates. The reactor operates satisfactorily at temperatures above the melting points of the compositions.

*Example III*

A two-region reactor having a core diameter of 1.7 feet is operated with a core solution of 36 parts by weight of $UO_2SO_4$, 57 parts $NaPO_3$, 20 parts $Na_2O$, 10 parts $MoO$ and 8 parts $Fe_2O_3$. The amount of core solution is sufficient to provide a U–233 critical mass of 37 kilograms. The concentration of the uranium is 17.7 weight percent based on the total weight of the solution and the amount of sulfur is about 15.2 atom percent based on the total number of atoms of sulfur and phosphorus present. The amount of metal oxides present is about 40 weight percent based on the weight of the metal oxides and sodium metaphosphate present. The blanket solution is the same as that described in Example I and is present in an amount sufficient to provide 761 kilograms of thorium.

*Example IV*

A two-region reactor is operated with a core having a diameter of 1.8 feet containing a solution of 36 parts by weight of $UO_2SO_4$, 64 parts $NaPO_3$ and 31 parts $P_2O_5$. The amount of uranium is 17.7 weight percent based on the total weight of the composition. The amount of sulfur based on the total amount of phosphorus and sulfur present is 9.1 atom percent. The amount of core solution is sufficient to provide a critical U–233 mass of 44 kilograms. The blanket region is filled with a solution having a composition comprising 34 parts by weight of $ThOSO_4$, 64 parts $Na_3PO_3$ and 38 parts $P_2O_5$. The amount of thorium is 17 weight percent based on the total weight of the blanket solution. The amount of sulfur present, based on the total amount of sulfur and phosphorus is 8.1 atom percent. The amount of blanket solution employed is sufficient to provide 1378 kilograms of thorium.

The reactor of Example IV is also operated satisfactorily on composition No. 13 of Table III.

*Example V*

A two-region reactor is operated with a core having a diameter of 1.6 feet. The core contains a solution having a composition composed of 56 parts by weight of $UO_3$, 31 parts $NaPO_3$, 28 parts $P_2O_5$ and 44 parts $Na_2S_2O_7$. The uranium concentration is 29.2 weight percent based on the total weight of the composition with the solution present in an amount sufficient to give a U–233 critical mass of 50 kilograms. The amount of sulfur present in the composition based on the total amount of sulfur and phosphorus present is about 36.4 atom percent. The blanket solution has a thorium content of 10.1 weight percent based on the total weight of the thorium solution and has a composition consisting essentially of 13.5 parts by weight of $ThO_2$, 30.6 parts $NaPO_3$, 28.4 parts $P_2O_5$ and 44.4 parts $Na_2S_2O_7$. The amount of thorium solution is sufficient to provide 729 kilograms of thorium. The amount of sulfur in the solution based on the total amount of sulfur and phosphorus present is about 36.4 atom percent.

In like manner, the reactor of Example V is operated with composition No. 7 of Table I in the core and a blanket region solution having the composition of No. 15 in Table I.

In like manner, a two-region reactor is operated with the core containing a critical mass of U–233 in the form of solution No. 2 of Table I and a blanket solution of composition No. 10 in Table I. Also, a two-region reactor is operated on a core solution containing a critical mass of U–233 in the form of solution No. 1 in Table I and a blanket solution having composition No. 9 in Table I.

The following examples illustrate a single region fused salt reactor in which the reactor is essentially the same as that described for the two-region reactor with the modification that the core has no blanket. That is, the fuel is contained all within a single region. The following non-limiting examples will further illustrate such reactor core compositions.

*Example VI*

A single region reactor having a core diameter of 5.2 feet is operated with a core solution of 1.2 parts by weight $UO_2$, 8.2 parts $ThO_2$, 80.6 parts $Na_2SO_4$ and 10 parts $ZnSO_4$. The amount of solution is sufficient to give a U–233 critical mass of 63 kilograms and a thorium content of 431 kilograms. The U–233 is present in an amount of 1 weight percent and the thorium is present in an amount of 7.2 weight percent based on the total weight of the composition. Ninety atom percent of the sulfur in the solution is present in the form of an alkali metal sulfate.

*Example VII*

A single region reactor is operated with a core having a diameter of 1.9 feet filled with a fuel solution having a composition of 10.8 parts by weight $UO_2$, 6.6 parts $ThSO_4$, 5.8 parts $Na_2S_2O_7$ and 76.8 parts $CuSO_4$. The amount of solution is sufficient to provide a U–233 critical mass of 27 kilograms and a thorium content of 14 kilograms. The concentration of U–233 is 9.5 weight percent and that of thorium is 4.7 weight percent based on the total weight of the composition. Ten atom percent of the total sulfur in the composition is present in the form of alkali metal sulfates.

Example VIII

A single region reactor is operated with the core having a diameter of 2.1 feet containing a solution having the composition consisting essentially of 10.4 parts by weight $UO_3$, 10.2 parts $ThO_2$, 32.2 parts $NaPO_3$, 40.8 parts $Zn_3(PO_4)_2$, 0.65 part $Li_2SO_4$ and 5.75 parts $CaS_2O_7$. The amount of solution is sufficient to provide a U–233 critical mass of 36 kilograms and a thorium content of 36 kilograms. The concentration of U–233 is 9 weight percent and the concentration of thorium is 9 weight percent based on the total weight of the composition. The amount of sulfur in the fuel solution is about 10 atom percent based on the total amount of sulfur and phosphorus present. Of the sulfur in the solution, 10 atom percent is present in the form of alkali metal sulfates. Of the phosphorus in the solution, about 60 atom percent is present in the form of alkali metal phosphates.

Example IX

The reactor of Example VIII is operated on a core solution having a composition of 10.4 parts by weight $UO_3$, 10.2 parts $ThO_2$, 78.2 parts $KPO_3$ and 1.2 parts $Rb_2S_2O_7$. The critical mass of U–233 is 36 kilograms and the thorium content is also 36 kilograms. The sulfur content is 1 atom percent based on the total amount of sulfur and phosphorus present.

Example X

A single region reactor is operated with a core having a diameter of 1.6 feet containing a solution of 26.4 parts by weight $UO_2SO_4$, 4.8 parts $ThO_2$, .3 part $LiPO_3$, 59.6 parts $K_2SO_4$ and 8.9 parts $BaSO_4$. The amount of solution is sufficient to give a U–233 critical mass of 29 kilograms and a thorium content of 7 kilograms. The U–233 concentration is 17 weight percent and that of thorium is 4.2 weight percent based on the total weight of the composition. The sulfur content of the solution is 99 atom percent based on the total amount of sulfur and phosphorus present. Of the sulfur in the solution, 90 atom percent is present in the form of alkali metal sulfate.

As in Example X, a single region reactor is operated on a solution having the composition of No. 22 in Table II. In like manner, a single region reactor is operated on composition No. 12 in Table I which contains, in addition, 1 weight percent sodium fluosulfonate and 1 weight percent sodium monofluorophosphate.

Example XI

A reactor of the design of the Liquid Metal Fuel Reactor (LMFR), described in the "Fluid Fuel Reactors" text, supra, and having the design specifications given on page 887 of the text, is operated on a core solution containing 0.1 weight percent U–233 in the form of $UO_2SO_4$ together with $Na_2SO_4$ and $ZnSO_4$ in the molar ratio of 3-to-2. The blanket contains a composition having 10 weight percent thorium in the form of $ThO_2$ together with $NaPO_3$ and $Na_2S_2O_7$ in the molar ratio of 3-to-5. The mass of U–233 in the system is about 330 kilograms and the mass of thorium is about 28,000 kilograms. The reactor is satisfactorily operated at a reactor core temperature of substantially 500° C.

The compositions of this invention provide an attractive fuel for homogeneous reactors, thus avoiding expensive fuel element fabrication and permitting higher fuel burn-up, as well as allowing removal of some fission product poisons during reactor operation as described in the "Fluid Fuel Reactors" text. The reactors operate at low pressures and favorable temperatures. For example, it is seen that the fuel compositions remain molten at a temperature of as low as 225° C. as shown in Table III. The fuel compositions readily remain fluid at temperatures above 400° C. The solutions are highly resistant to radiation damage and are not highly corrosive to Inconel and steel containers. Zircalloy 2, Hastelloy and zirconium carbide are not noticeably corroded by the compositions.

When the fuel is circulated for the removal of heat, a 4 or 5 foot diameter core provides a 500 mw. reactor of the single region type.

The two-region reactors with the melt remaining stationary is operated as a fast reactor of 100 to 200 mw. power using a melt of 10 weight percent uranium or greater in a 2-foot core. When the reactor is operated as an epithermal reactor of high power of the order of 500 mw. or higher, the uranium concentration in the fuel is about 2 weight percent or less and the fuel is circulated through the core which has a diameter of about 5 feet.

The term "fissionable material," referred to in this writing, is uranium, thorium or plutonium. The term includes natural uranium. In other words, no distinction is made between the various isotopes of uranium or of thorium or of plutonium. References to uranium in this writing may be taken to mean natural uranium, unless otherwise specified. The phosphate compounds described in this writing include polyphosphates such as, for example, $Na_4P_2O_7$. Also, the oxyacid salts referred to herein are salts of oxygenated anions as, for example, $UO_2SO_4$, $Na_2UO_4$, $Na_2U_2O_7$, $Na_2Pu_2O_7$, etc. The term "metal oxides," whenever used hereinabove, includes metalloid oxides such as $SiO_2$, etc.

The examples to the use of specific fuel compositions in the fused salt type of reactors and in the liquid metal fuel reactor type are by way of illustration only and not to be construed as limitations on the compositions of this invention. Reactors are operated employing all the fuels disclosed in Tables I, II and III and elsewhere throughout this writing. The examples and descriptions given above are merely illustrative and not restrictive of the present invention. Variations of the compositions may be made within the scope of the invention by those familiar with nuclear fuel technology and the operation of nuclear reactors. Therefore, the present invention should be limited only as indicated by the appended claims.

I claim:

1. A fused nuclear reactor fuel composition for utilization in molten form, consisting essentially of
   (1) from about 0.01 to about 50 wt. percent based on the total weight of said composition of at least one element selected from the class consisting of uranium, thorium, and plutonium, wherein said element is present in the form of at least one component selected from the class consisting of oxides and salts of oxygenated anions, and
   (2) the remainder at least one member selected from the class consisting of
       (a) sulfur, wherein said sulfur is in the form of at least one entity selected from the class consisting of oxides of sulfur, non-fissionable metal sulfites and halosulfonates, and acids of sulfur, wherein at least 10 atom percent of said sulfur is present in the form of alkali metal-containing sulfur entities, and
       (b) phosphorus, wherein said phosphorus is in the form of at least one constituent selected from the class consisting of oxides of phosphorus, and non-fissionable metal phosphates, phosphites and halophosphates, wherein at least about 60 atom percent of said phosphorus is present in the form of at least one constituent selected from the class consisting of oxides of phosphorus and alkali metal metaphosphates.

2. A fused nuclear reactor fuel composition for utilization in molten form, consisting essentially of
   (1) from about 0.01 to about 50 wt. percent based on the total weight of said composition of at least one element selected from the class consisting of uranium, thorium, and plutonium, wherein said element is present in the form of at least one component selected from the class consisting of oxides and salts of oxygenated anions, (2) sulfur, wherein said sulfur is in the form of at least one entity selected from the class consisting of oxides of sulfur, non-fissionable metal sulfites and halosulfonates, and acids of sulfur, wherein at least 10 atom percent of said sulfur is present in the form of alkali metal-containing sulfur entities, and (3) phosphorous, wherein said phosphorus is in the form of at least one constituent selected from the class consisting of oxides of phosphorus, and non-fissionable metal phosphates, phosphites and halophosphates, wherein at least about 60 atom percent of said phosphorus is present in the form of at least one constituent selected from the class consisting of oxides of phosphorus and alkali metal metaphosphates.

3. The composition of claim 2 wherein said elements in (1) are in the form of oxides.

4. A fused reactor fuel composition for use in molten form consisting essentially of $XPO_3$, $X_2S_2O_7$, $UO_3$ and $P_2O_5$, wherein X is an alkali metal, and wherein said composition consists of 10–36 wt. percent $UO_3$.

5. A fused reactor fuel composition for use in molten form consisting essentially of $UO_3$, $XPO_3$, $XP_2O_7$, and $X_2SO_4$, wherein X is an alkali metal, and wherein said composition consists of 10–36 wt. percent $UO_3$.

6. A fused reactor fuel composition for use in molten form consisting essentially of $XPO_3$ and $UO_2SO_4$, wherein X is an alkali metal.

7. A fused reactor fuel composition for use in molten form consisting essentially of, by molecular formula:

$$3NaPO_3:UO_2SO_4$$

8. A fused nuclear reactor fuel composition for utilization in molten form, consisting essentially of (1) from about 0.01 to about 50 wt. percent based on the total weight of said composition of at least one element selected from the class consisting of uranium, thorium, and plutonium, wherein said element is present in the form of at least one component selected from the class consisting of oxides and salts of oxygenated anions, and (2) the remainder sulfur, wherein said sulfur is in the form of at least one entity selected from the class consisting of oxides of sulfur, non-fissionable metal sulfites and halosulfonates, and acids of sulfur, wherein at least 10 atom percent of said sulfur is present in the form of alkali metal-containing sulfur entities.

9. The composition of claim 8 wherein said elements in (1) are in the form of oxides and said sulfur is in the form of alkali metal-containing sulfur components.

10. The composition of claim 9 wherein the said oxide is $UO_3$ and comprises 10–36 wt. percent of the fuel composition.

11. A fused nuclear reactor fuel composition for utilization in molten form, consisting essentially of (1) from about 0.01 to about 50 wt. percent based on the total weight of said composition of at least one element selected from the class consisting of uranium, thorium, and plutonium, wherein said element is present in the form of at least one component selected from the class consisting of oxides and salts of oxygenated anions, and (2) the remainder phosphorus, wherein said phosphorus is in the form of at least one constituent selected from the class consisting of oxides of phosphorus, and non-fissionable metal phosphates, phosphites and halophosphates, wherein at least about 60 atom percent of said phosphorus is present in the form of at least one constituent selected from the class consisting of oxides of phosphorus and alkali metal metaphosphates.

12. The composition of claim 11 wherein the components in (1) are in the form of oxides.

13. The composition of claim 12 wherein the oxide components consist of about 10–36 wt. percent of the fuel composition and said phosphorus is present in the form of alkali metal phosphates.

References Cited in the file of this patent

UNITED STATES PATENTS

| | | |
|---|---|---|
| 2,741,593 | Metcalf et al. | Apr. 10, 1956 |
| 2,816,042 | Hamilton | Dec. 10, 1957 |
| 2,818,605 | Miller | Jan. 7, 1958 |
| 2,820,753 | Miller et al. | Jan. 21, 1958 |
| 2,824,784 | Hansen | Feb. 25, 1958 |
| 2,835,608 | Kanter | May 20, 1958 |
| 2,837,476 | Busey | June 3, 1958 |
| 2,908,621 | Segre et al. | Oct. 13, 1959 |
| 2,929,767 | Hammond et al. | Mar. 22, 1960 |
| 2,939,803 | Steele et al. | June 7, 1960 |

OTHER REFERENCES

Nuclear Science and Engineering, November 1957, pp. 826–853.